United States Patent [19]

Stohs

[11] Patent Number: 4,890,271

[45] Date of Patent: Dec. 26, 1989

[54] REDUNDANT TERMINATION OF A COMMUNICATION LINE FOR MAINTAINING THE LINE PROPERLY TERMINATED WHEN ONE OF THE TERMINATIONS IS UNPOWERED

[75] Inventor: Norbert E. Stohs, Batavia, Ill.

[73] Assignees: American Telephone and Telegraph Company, New York, N.Y.; AT & T Bell Laboratories, Murray Hill, N.J.

[21] Appl. No.: 722,657

[22] Filed: Apr. 12, 1985

[51] Int. Cl.$^4$ .......................... H02J 9/00; G11B 5/008
[52] U.S. Cl. ........................................... 369/24; 307/64
[58] Field of Search ... 364/200 MS File, 900MS File; 340/310 R, 507, 693, 333; 369/24–29, 53; 360/31; 307/66, 64; 379/186, 176, 322–324; 363/65

[56] References Cited

U.S. PATENT DOCUMENTS 3,999,163 12/1976 Levy et al. .
4,130,899 12/1978 Bowman et al. .................... 365/222
4,204,249 5/1980 Dye et al. ............................ 307/64
4,481,626 11/1984 Boggs et al. ......................... 370/85
4,495,568 1/1985 Gilbert et al. ....................... 364/200

FOREIGN PATENT DOCUMENTS 59-171347 2/1985 Japan .

OTHER PUBLICATIONS

P. L. Borrill "Microprocessor Bus Structures and Standards", *Proc. 6th Euromicro Symposium on Microprocessing & Microprogramming* (Sep. 16–18, 1980, London) pp. 285–296.

*Primary Examiner*—Alan Faber
*Assistant Examiner*—James E. Tomassini
*Attorney, Agent, or Firm*—David Volejnicek

[57] ABSTRACT

An input and output system has a plurality of tape drives (1–3) connected by a daisy-chained bus (5) to a processor (4). Each of two tape drives (2, 3) at the end of the bus has a terminator (30, 31) for transmit lines (6) of the bus. Each terminator of each line comprises a pull-down resistor (40) connecting the line to ground, and a pull-up resistor (41) and a diode (42) in series connecting the line to a source of potential (43). When a source is powered up, potential is present and a diode connected thereto is forward biased and supplies potential to the line. When the source is powered down and potential is withdrawn, a diode connected thereto becomes reverse-biased and prevents the powered-down source from grounding the line. Redundant termination of each line therefore allows any one tape drive to be powered down without precluding communications over the bus from continuing while the other terminator continues to supply the line with potential.

8 Claims, 1 Drawing Sheet

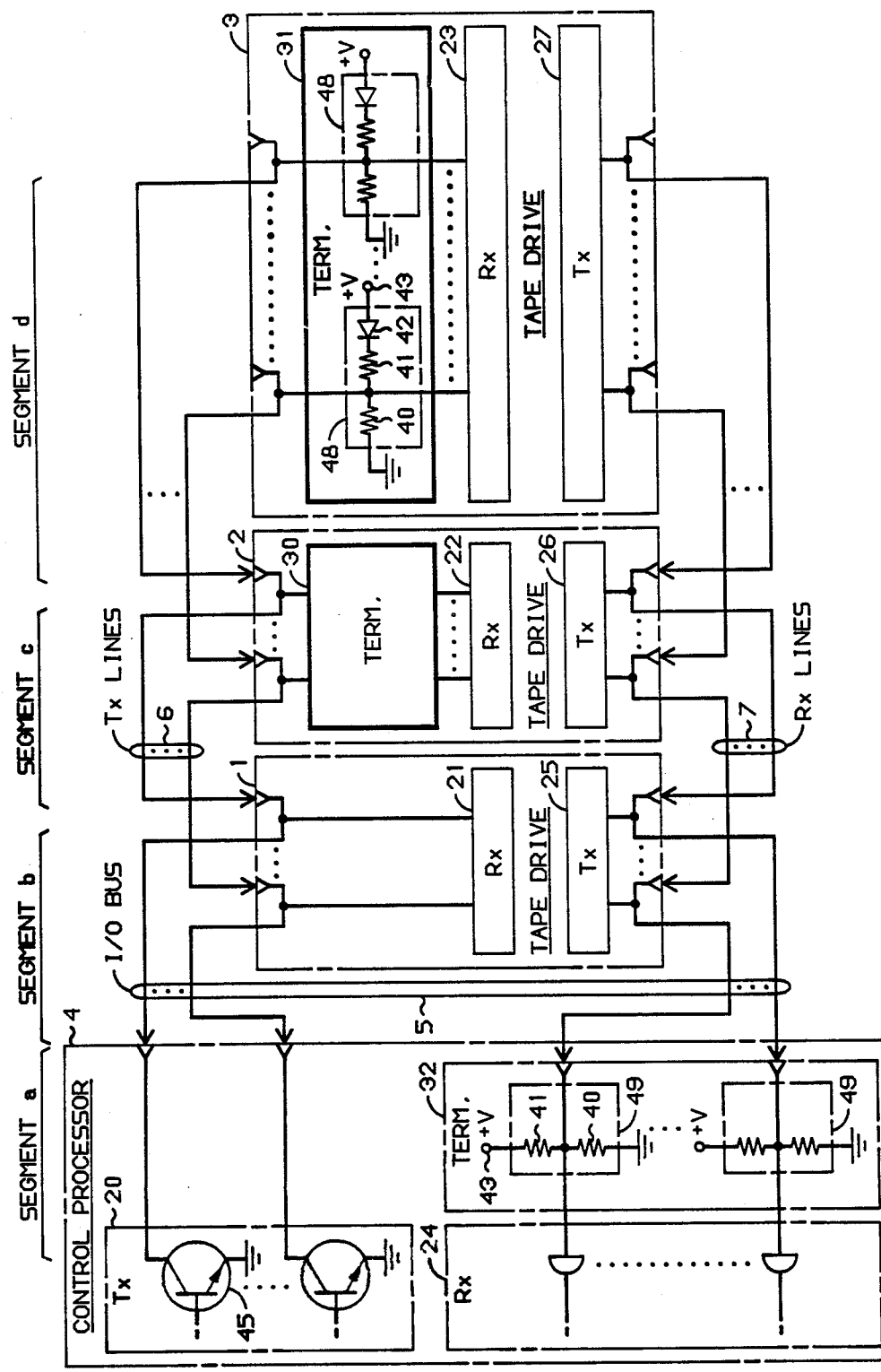

REDUNDANT TERMINATION OF A COMMUNICATION LINE FOR MAINTAINING THE LINE PROPERLY TERMINATED WHEN ONE OF THE TERMINATIONS IS UNPOWERED

TECHNICAL FIELD

This invention relates to communicating busing arrangements, and particularly to facilities for power and impedance termination for such arrangements.

BACKGROUND OF THE INVENTION

Communication links, such as buses, must have proper conditioning to impart to the links such electrical characteristics as are required for communications to proceed over the links. Such conditioning is commonly provided by link terminating apparatus. As the name implies, that apparatus is connected to the end of a link. A bidirectional link is terminated at both ends; a unidirectional link only requires termination at the destination end. The terminating apparatus generally provides proper impedance to prevent reflection of signals from the ends of the link, and also connects a power source and/or sink to the link to power the link and maintain it at the proper operating voltage.

Certain types of systems, particularly input and output (I/O) systems, use a daisy-chained bus as a communication link between a processor and a plurality of devices such as I/O devices. A daisy-chained bus is one which interconnects communicating units in such a manner that physical disconnection of any one of the units effectively interrupts the bus and separates it into two disjointed segments. Connection of units to such bus and disconnection of units from the bus therefore adds segments to, and removes segments from, the bus. Hence, the ends of the bus change with the connection and disconnection of units. Therefore, provision must be made for disconnection of bus terminating apparatus from the old ends of the bus and connection thereof to the new ends of the bus when the system is reconfigured. This is commonly accomplished by including terminating apparatus in two of the units each of which is always connected to one end of the bus upon system reconfiguration. Each of the two units terminates bidirectional bus signal lines and those unidirectional signal lines whose destination end is connected to the unit.

Since termination apparatus is included in a unit, it uses the power source of that unit as the power source to which it couples the bus to maintain it at the proper operating voltage. This creates a problem, however, in that whenever this unit is powered down for any reason, such as for maintenance, the source of power to the bus is lost and the terminating apparatus can no longer perform its prescribed function. Furthermore, the powered-down power source typically offers a low impedance path to ground, and thus tends to ground the bus. As a consequence, the bus becomes inoperative and hence the whole system becomes disabled while the one unit is powered down. It is desirable to maintain communications capabilities between the remaining powered-up units, but the commonly-used termination arrangement does not make that possible.

SUMMARY OF THE INVENTION

This invention is directed to solving this and other disadvantages of the prior art. According to the invention, a terminating arrangement for a communication line comprises an arrangement for coupling the line to an electrical potential to supply the line with a predetermined voltage, and apparatus in the coupling arrangement that is effective upon withdrawal of the electrical potential for enabling the predetermined voltage to be substantially maintainable on the line by another terminating arrangement. Further according to the invention, a communication system comprises a communication line and a plurality of communication units connected to the line, two of which units each have the following nature: The unit includes a power source and a line terminator for coupling the line to the power source; the terminator comprises apparatus for coupling the line to the power source to supply the line with a predetermined voltage when the power source is powered up, and apparatus in the coupling apparatus for enabling the predetermined voltage to be substantially maintained on the line when the power source is powered down and the other of the two units is coupling the line to a powered-up power source.

A powered-down power source acts as a low-impedance path to ground, and thus tends to pull the line to ground potential. However, the enabling apparatus in the terminator that couples the line to the power source provides a high-impedance load to the line when the power source is powered down and thereby prevents the coupling arrangement of the terminator and the powered-down power source from grounding the line. Hence, if a second terminator is coupling the line to an active power source, the line's voltage is maintained thereby above a predetermined threshold level. Line voltages represent logic values, and movement of the line voltage past the threshold level would represent a change in the line's logic value. Hence, the enabling apparatus of the terminator enables the line to maintain its logic value while it is idle, that is, while communications are not proceeding thereacross. Flow of communications involves changes in the line's logic values, of course.

The invention provides a communication system with operational contiguity, enabling communications to proceed over the line even when termination capability is lost at one of the units due to power loss. Provision of conventional terminators at the two units would not provide a high-impedance load to the line at a powered-down power source, and hence would not result in system operational contiguity. Provision of the terminators having the enabling apparatus at two units of the system allows one of the two units, plus any one or more other units, to be powered down, for example for maintenance purposes, without interruption of communications between other units connected to the line, and hence improves system availability. Furthermore, provision of such terminators at two, as opposed to more, units strikes an optimum balance between system operational contiguity and disadvantages that are brought about by increasing the number of terminators. These disadvantages are discussed in the detailed description portion of the application.

The enabling apparatus of the terminator may be a unidirectionally conducting element that serially connects the line through the coupling arrangement to the power source. The element is conductive when electrical potential is present at the power source, and is non-conductive when the electrical potential is withdrawn. Such a unidirectionally conducting element is, for example, a diode that is forward-biased by the electrical potential and that becomes reverse-biased upon withdrawal of the potential.

A specific exemplary embodiment of the invention provides each terminator of a line of an input and output bus that provides communication connection from a control control processor to a plurality of tape drives with a pull-down resistor coupling the line to ground and a pull-up resistor and a diode connected in series and coupling the line to a power source. One terminator for each line and a power source are included in each one of two tape drives. When the power source is powered up and supplying electrical potential, the diode is forward-biased and enables operating voltage to be supplied to the line through the terminator. When the power source is powered down and electrical potential is withdrawn thereby, the diode becomes reverse-biased by voltage supplied to the line by the other terminator, and the diode prevents the line from being grounded by the powered-down power supply.

These and other advantages and features of the present invention will become apparent from the following description of an illustrative embodiment of the invention, taken together with the drawing.

BRIEF DESCRIPTION OF THE DRAWING

The Figure is a block and schematic diagram of an input and output system embodying an illustrative example of the invention.

DETAILED DESCRIPTION

The Figure shows an illustrative input and output (I/O) system that comprises a plurality of communication devices: three tape drives 1-3 and a control processor 4 for controlling operation of the drives 1-3. The drives 1-3 and processor 4 are interconnected for communication by an I/O bus 5.

The bus 5 is a daisy-chained bus, divided into a plurality of segments a-d, each of which is associated with one of the units 1-4, respectively. Each segment is permanently connected to its associated unit 1-4 and is disconnectably connected, for example by means of connectors, to the segment or segments of the adjacent unit or units, respectively. Physical disconnection of a unit 1-4 from the bus 5 is accomplished by means of uncoupling its associated segment from the segment of the adjacent unit, and hence results in physical removal from the bus 5 of the disconnected unit's associated bus segment. Nevertheless, the units 1-4 are connected to the bus 5 in parallel.

The bus comprises a plurality of transmit (Tx) lines 6 which carry communications from the processor 4 to the drives 1-3, and a plurality of receive (Rx) lines 7 which carry communications from the drives 1-3 to the processor 4. Hence, the Tx lines 6 and the Rx lines 7 are unidirectional communication lines. The Tx lines 6 are connected to a transmitter 20 at the processor 4 and to receivers 21-23 at the drives 1-3, respectively. At the two drives 2 and 3 which are connected to the tail end of the Tx lines 6, the Tx lines 6 are also connected to terminators 30 and 31, respectively. Each Tx line 6 is thus terminated redundantly. The Rx lines 7 are connected to transmitters 25-27 at the drivers 1-3, respectively, and to a receiver 24 and a terminator 32 at the processor 4. The processor 4 is connected to the tail end of the Rx lines 7. All transmitters 20 and 25-27 are substantially identical, as are all receivers 21-24. Terminators 30 and 31 are also identical and differ from terminator 32.

The bus 5 is a transistor-transistor logic (TTL) bus: its lines 6 and 7 are driven by open-collector transistors. As illustrated by the transmitter 20, at each transmitter 20 and 25-27 each line 6 or 7 that is connected thereto is coupled to the open collector of an NPN transistor 45. The emitters of the transistors 45 are connected to ground. As illustrated by the receiver 24, at each receiver 21-24 each line 6 or 7 that is connected thereto is coupled to an input of a TTL-type gate.

At the control processor 4, each Rx line 7 is terminated at the terminator 32 in a conventional manner: each line 7 is connected to a resistor network 49 comprising a pull-down resistor 40 that couples the line to ground, and a pull-up resistor 41 that couples the line to a power source 43 that supplies an electrical potential V+ when it is active, i.e., powered up.

At the terminators 30 and 31 of the tape drives 2 and 3, each Tx line 6 is connected to a resistor network 48 comprising a pull-down resistor 40 that couples the line to ground, and a pull-up resistor 41 and a diode 42 which are connected in series and which couple the line through the terminator to a power source 43 that supplies an electrical potential V+ when active.

When the bus 5 is idle, i.e., no communications are passing thereacross, the transistors 45 of the transmitter 20 and 25-27 are turned off and not conducting. Assuming that all units 1-4 are powered up, electrical potential V+ is present at the terminators 30-32. The diodes 42 of the networks 48 of the terminators 31-32 are forward-biased and act substantially as short circuits, and each resistor network 48 and 49 of the terminators 30-32 functions as a voltage divider, supplying voltage to the line 6 or 7 to which it is connected and pulling up the associated line to a predetermined voltage level $V_1$. $V_1$ is a function of the relative values of the pull-up resistor 41 and the pull-down resistor 40 of each network 48 and 49. Voltage of 2.4 V or higher is considered to be the logical 1 value. The resistors 40 and 41 of the networks 49 of the terminator 32 are selected to produce a predetermined voltage level of 2.5 V on the Rx lines 7. The resistors 40 and 41 of the networks 48 of the terminators 30-31 are selected to produce a predetermined voltage level of 3.1 V on the Tx lines 6. Hence in the idle state the lines 6 and 7 of the bus 5 are maintained by the terminators 30-32 at logical 1 value.

A voltage of 0.7 V or lower is considered to be the logical 0 value. Voltages between 0.7 V and 2.4 V have no defined logical values. To produce a logical 0 value on a line 6 or 7 of the bus 5, a transmitter transistor 45 that is connected thereto turns on and pulls the line to ground potential.

Communications proceed in the system only between the processor 4 and the drives 1-3; the drives 1-3 do not communicate with each other. For this reason, it does no matter that the Rx lines 7 cease to be terminated when the processor 4 is unpowered and the voltage V+ is lost at the terminator 32. Therefore it is sufficient to terminate the Rx lines 7 in the conventional manner, by the terminator 32.

However, it is desirable to allow communications to proceed over the bus 5 when any one of the drives 1-3 is unpowered. Unpowering of any one or more drives has no effect on the communicating capability of the bus 5 so long as at least one drive which has a terminator connected to the Tx lines 6 remains powered. Unpowering of any one or more drives, like the drive 1, which do not terminate Tx lines 6 has no effect on the communication capability of the bus 5. Unpowering of either drive 2 or 3 also allows communications to proceed over the bus 5 so long as the other of the drives 2 or 3 remains powered.

Assuming that the drive 2 is unpowered, its power source 43 is powered down, i.e., inactive, and the potential V+ is withdrawn from the terminator 30. Instead, the power source 43 acts as a ground and reverse-biases the diodes 42 that are connected thereto. Since the diodes 42 are unidirectionally conducting devices, this makes each diode 42 that is connected to the unpowered power source 43 nonconductive, acting like an open circuit, and therefore both the associated pull-up resistor 41 and the power source 43 become electrically uncoupled thereby from the associated line 6. At this point, only one pull-up resistor 41 — of the terminator 31 — is pulling the line 6 up, while the pull-down resistors 40 of both terminators 30 and 31 are pulling the line 6 down. This results in the line 6 dropping from $V_1$ of 3.1 V to $V_1$ of 2.5 V. This disturbance in the voltage $V_1$ of the line 6 is insubstantial inasmuch the line voltage does not drop past the threshold voltage level of 2.4 V for a logical 1 value and hence is still sufficient to maintain the line at logical 1 level. If the diode 42 were not present, there would be three instead of two resistors pulling the line 6 down. This would result in the line dropping to a $V_1$ of less than the threshold level of 2.4 V that is necessary to maintain the line at logical 1 level, and the line would change in logical value from logical 1 to indeterminate, and communications capability of the bus 5 would be disrupted. The diode 42 prevents these deleterious changes from taking place.

To compensate for the effect of absence of the diode 42, the network 49 resistor values perhaps could be selected such as to produce a $V_1$ of over 2.4 V when one of the terminators 30 and 31 was powered down. The result would be to produce a $V_1$ substantially greater than 3.1 V when both terminators 30 and 31 were powered up. However, there are disadvantages associated with raising $V_1$, as is explained below, and hence this approach is not desirable.

It may seem that it would be desirable to equip each drive 1-3 with a terminator for the Tx lines 6, so that any combination of any number of drives could be unpowered without destroying communication capability over the bus 5. Such an approach is not practical, however, for the following reasons.

First, the system of the Figure would have excessive power consumption. Increasing the number of terminators increases the number of resistive networks 48 connected to each Tx line, and hence greatly increases the total number of networks in the system. Each resistor network draws current from a power source 43 to ground. Hence increasing the number of terminators greatly increases the current — and consequently power — being drawn by the system.

Second, the current-carrying capacity of the transistors 45 of the transmitter 20 would have to be increased beyond practical limits. Each pull-up resistor 41 connected to a Tx line conducts current to the line, and hence increases the amount of current that the associated transistor 45 must sink in order to pull the line down to logical 0 level, i.e., ground. Transmitters like the transmitter 20 are generally implemented with transistors 45 that are capable of sinking current produced by at most about two pull-up resistors 41. Hence, the transmitter would have to be redesigned, and existing transmitters would have to be modified with transistors 45 of higher current-carrying capacity. Generally, the higher is the current-carrying capacity of a transistor, the higher is the transistor's cost, the greater is the transistor's size, and the more cooling it requires. Hence the size and cost of transmitters would be substantially increased.

Third, the speed of operation of the bus 5 would be appreciably reduced. Generally, the greater the amount of current that a transistor must sink, the longer it takes for the transistor to pull down the voltage level. Furthermore, the possibility of a plurality of terminators being unpowered creates the possibility that only one pull-up resistor would be pulling the line up while numerous pull-down resistors would be pulling the line down. $V_1$ in this situation would have to at least equal 2.4 V, and hence $V_1$ with all terminators powered up would have to significantly exceed 2.4 V. But the greater the voltage swing that the transistors must produce, the longer it takes. The combination of having to produce a larger voltage swing and having to sink a greater current would significantly slow down the switching speed of the transmitter transistors and thereby reduce the rate at which communications could be carried on over the bus 5.

With these competing considerations, the optimum compromise has been found to be to equip the last two of the drives with transmit line terminators.

Of course, various changes and modifications to the illustrative embodiment described above will be apparent to those skilled in the art. For example, the invention may be applied to communication links other than bus lines, to links that are not daisy-chained, and to links that have bidirectional lines. Or the link terminators need not simply comprise voltage divider networks. Furthermore, the terminator diodes may be replaced by other means for preventing an unpowered power supply from pulling down the link. Nor does the link need to operate at the illustrative voltage levels, but may operate at some other levels, including negative voltage levels. Such changes and modifications can be made without departing from the spirit and the scope of the invention and without diminishing its attendant advantages. It is therefore intended that such changes and modifications be covered by the following claims.

What is claimed is:

1. A line terminating arrangement for a communication line having a plurality of communication units connected thereto for communicating thereacross, two of the communication units each including its own power source, the terminating arrangement comprising, at only the two units that include their own power sources:
    two means each connected to a different one of only the two units which include the power sources, each for coupling the line to the power source of the connected unit to supply the line with a predetermined voltage when the power source of the connected unit is powered up; and
    two means each in a different one of the two coupling means for enabling the predetermined voltage to be substantially maintained on the line when the power source of the connected unit is powered down and the other one of the two coupling means is coupling the line to a powered-up power source.

2. The arrangement of claim 1 wherein
    each of the coupling means comprise
    means for maintaining the line at a predetermined voltage level when the line is idle and the power source of the connected unit is powered up; and wherein each of the enabling means comprise means for preventing the coupling means and the power source of the connected unit from changing the line's voltage level past a predetermined threshold level when the power source of the connected unit is powered down and the other one of the two coupling means is coupling the line to a powered-up power source.

3. The arrangement of claim 1 wherein each of the coupling means comprise means for maintaining the line at a predetermined logic value when the line is idle and the power source of the connected unit is powered up; and wherein each of the enabling means comprise means for providing a high-impedance load to the line through the coupling means and the power source of the connected unit to maintain the line at the predetermined logic value when the power source of the connected unit is powered down and the other one of the two coupling means is coupling the line to a powered-up power source.

4. The arrangement of claim 1 wherein each of the enabling means comprise means for electrically uncoupling the coupling means from the power source of the connected unit when the power source of the connected unit is powered down.

5. The arrangement of claim 4 wherein each of the upcoupling means comprise unidirectionally conducting means serially connecting the line through the coupling means to the power source of the connected unit, the unidirectionally conducting means conducting when the power source of the connected unit is powered up and nonconducting when the power source of the connected unit is powered down.

6. The arrangement of claim 5 wherein the unidirectionally conducting means comprise a diode that is forward biased when the power source of the connected unit is powered up and that is reverse biased when the power source of the connected unit is powered down.

7. The line terminating arrangement as recited in claim 1 wherein:

the plurality of communication units comprises a control processor and a plurality of tap drives; wherein the two of the communication units which are coupled to the lines are two of the plurality of tape drives; wherein each power source of the two communication units which are coupled to the lines is a tape drive's own power supply; wherein the communication line comprises a daisy-chained line of an input and output bus that provides a connection for communication from the control processor to the plurality of tape drives, said bus being powered by electric potential supplied through said line terminating arrangement when a power supply connected to said line terminating arrangement is supplying potential thereto; wherein the means for coupling the line to the power source to supply the line with a predetermined voltage when the coupled power source is powered up comprises a plurality of diodes nd first and second resistors, each one of said lines coupled in each one of two of said tape drives to said power supply of said tape drive by its own one of said first resistors and its own one of said didoes connected in series, and each of of said lines in each one of said two tape drives coupled to ground by its own one of said second resistors; and wherein the means in the coupling means for enabling the predetermined voltage to be substantially maintain on the coupled power source is powered down and the other of the two units is coupling the line to a powered up power source comprises said diodes;

whereby said coupled lines are powered when at least one of said two power supplies of said tape drives that coupled to said lines is each supplying potential and forward-biasing said diodes which are coupled thereto, and whereby said diodes which are coupled to said power supply of one of said two tape drives are reverse-biased when said power supply which is coupled to said diodes ceases to supply potential, to prevent said power supply which is coupled to said diodes from grounding said coupled lines when it has ceased to supply said potential.

8. A line terminating arrangement for daisy-chained lines of an input and output bus that provides a connection for communication from a control processor to a plurality of tape drives each one of which has its own power supply, said bus being power by electric potential supplied through said line terminating arrangement when a power supply connected to said line terminating arrangement is supplying potential thereto, the line terminating arrangement comprising:

a plurality of diodes and first and second resistors, each one of said lines coupled in each one of only two of said tape drives to said power supply of said tape drive by the line's own one of said first resistors and the line's own one of said diodes connected in series, and each one of said lines in each one of said only two tape drives coupled to ground by the line's own one of said second resistors;

whereby said coupled lines are powered when at least one of said two power supplies of said only two tape drives that are coupled to said lines is each supplying potential and forward-biasing said diodes which are coupled thereto, and whereby said diodes which are coupled to said power supply of one of said only two tape drives are reverse-biased when said power supply which is coupled to said diodes ceases to supply potential, to prevent said power supply which is coupled to said diodes from grounding said coupled lines when it has ceased to supply said potential.

* * * * *